US011518207B2

(12) United States Patent
Ohno et al.

(10) Patent No.: US 11,518,207 B2
(45) Date of Patent: Dec. 6, 2022

(54) ELECTRICALLY POWERED SUSPENSION SYSTEM

(71) Applicant: HONDA MOTOR CO., LTD., Tokyo (JP)

(72) Inventors: Satoshi Ohno, Wako (JP); Atsuhiko Yoneda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 352 days.

(21) Appl. No.: 16/830,467

(22) Filed: Mar. 26, 2020

(65) Prior Publication Data

US 2020/0307337 A1 Oct. 1, 2020

(30) Foreign Application Priority Data

Mar. 27, 2019 (JP) .............................. JP2019-061141

(51) Int. Cl.
*B60G 17/018* (2006.01)
*B60G 17/06* (2006.01)
(Continued)

(52) U.S. Cl.
CPC ....... *B60G 17/018* (2013.01); *B60G 17/0157* (2013.01); *B60G 17/0165* (2013.01);
(Continued)

(58) Field of Classification Search
CPC .............. B60G 17/018; B60G 17/0157; B60G 17/0165; B60G 17/06; B60G 2400/204;
(Continued)

(56) References Cited

U.S. PATENT DOCUMENTS 3,719,888 A * 3/1973 Sampey ................... G01P 1/106
324/161
4,740,898 A * 4/1988 McKee ................ B60K 31/047
701/99
(Continued)

FOREIGN PATENT DOCUMENTS

JP 2006-062550 A 3/2006
JP 2007-302055 A 11/2007
(Continued)

OTHER PUBLICATIONS

Office Action received in corresponding Japanese application No. 2019-061141 dated Oct. 27, 2020 with English translation (6 pages).

*Primary Examiner* — Frank B Vanaman
(74) *Attorney, Agent, or Firm* — Rankin, Hill & Clark LLP

(57) ABSTRACT

Included are an electromagnetic actuator which generates drive forces for a damping operation and a telescopic operation; an information acquirer which acquires information about the drive forces of, and control mode selection information about, the electromagnetic actuator; a drive force arithmetic part which sets a predetermined control mode based on the control mode selection information about the electromagnetic actuator, and sets a target damping force and a target telescopic force of the electromagnetic actuator based on setting information about the control mode; and a drive controller which controls drive of the electromagnetic actuator using a target drive force based on the target damping and telescopic forces set by the drive force arithmetic part. The drive force arithmetic part performs an operation of switching a setting of the predetermined control mode from one to another while a driving force of the electromagnetic actuator is within a predetermined force range.

5 Claims, 9 Drawing Sheets

(51) Int. Cl.
*B60G 17/015* (2006.01)
*B60G 17/0165* (2006.01)

(52) U.S. Cl.
CPC ........ *B60G 17/06* (2013.01); *B60G 2400/204* (2013.01); *B60G 2400/30* (2013.01); *B60G 2500/10* (2013.01); *B60G 2600/182* (2013.01); *B60G 2600/26* (2013.01); *B60G 2800/162* (2013.01)

(58) Field of Classification Search
CPC .......... B60G 2500/10; B60G 2600/182; B60G 2800/162
See application file for complete search history.

(56) References Cited

U.S. PATENT DOCUMENTS

| | | | |
|---|---|---|---|
| 5,175,687 A * | 12/1992 | Tsutsumi | B60G 17/01941 280/5.515 |
| 5,390,121 A * | 2/1995 | Wolfe | B60G 17/0185 280/124.101 |
| 5,487,005 A * | 1/1996 | Genise | F16H 59/52 74/335 |
| 2002/0089107 A1* | 7/2002 | Koh | B60G 17/02 267/218 |
| 2012/0013277 A1* | 1/2012 | Ogawa | H02P 3/12 318/368 |
| 2014/0288776 A1* | 9/2014 | Anderson | B60G 17/0182 701/37 |
| 2018/0134111 A1 | 5/2018 | Toyohira et al. | |
| 2018/0361813 A1 | 12/2018 | Ohno et al. | |
| 2018/0361814 A1 | 12/2018 | Ohno et al. | |
| 2020/0070613 A1* | 3/2020 | Tokuhara | B60G 17/015 |

FOREIGN PATENT DOCUMENTS

| | | |
|---|---|---|
| JP | 2009-132222 A | 6/2009 |
| JP | 2009-255777 A | 11/2009 |
| JP | 2010-132222 A | 6/2010 |
| JP | 2017-165282 A | 9/2017 |
| JP | 2019-001368 A | 1/2019 |
| JP | 2019-001370 A | 1/2019 |

* cited by examiner

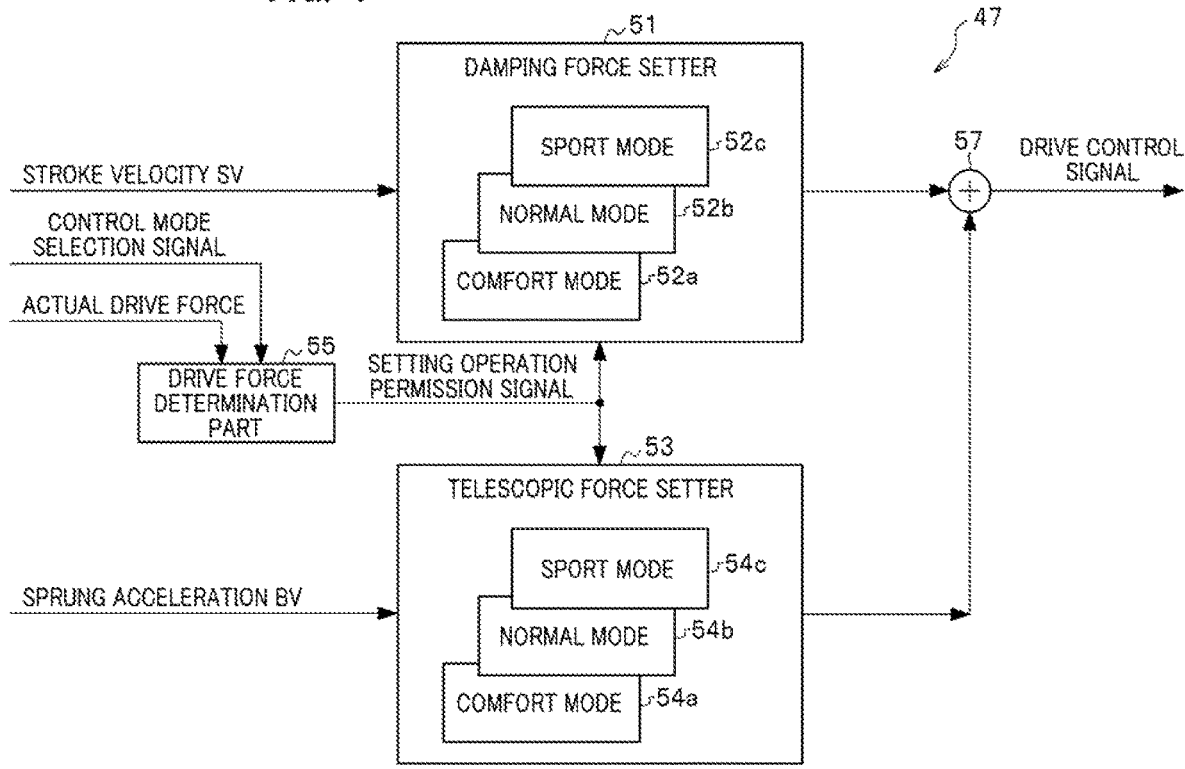

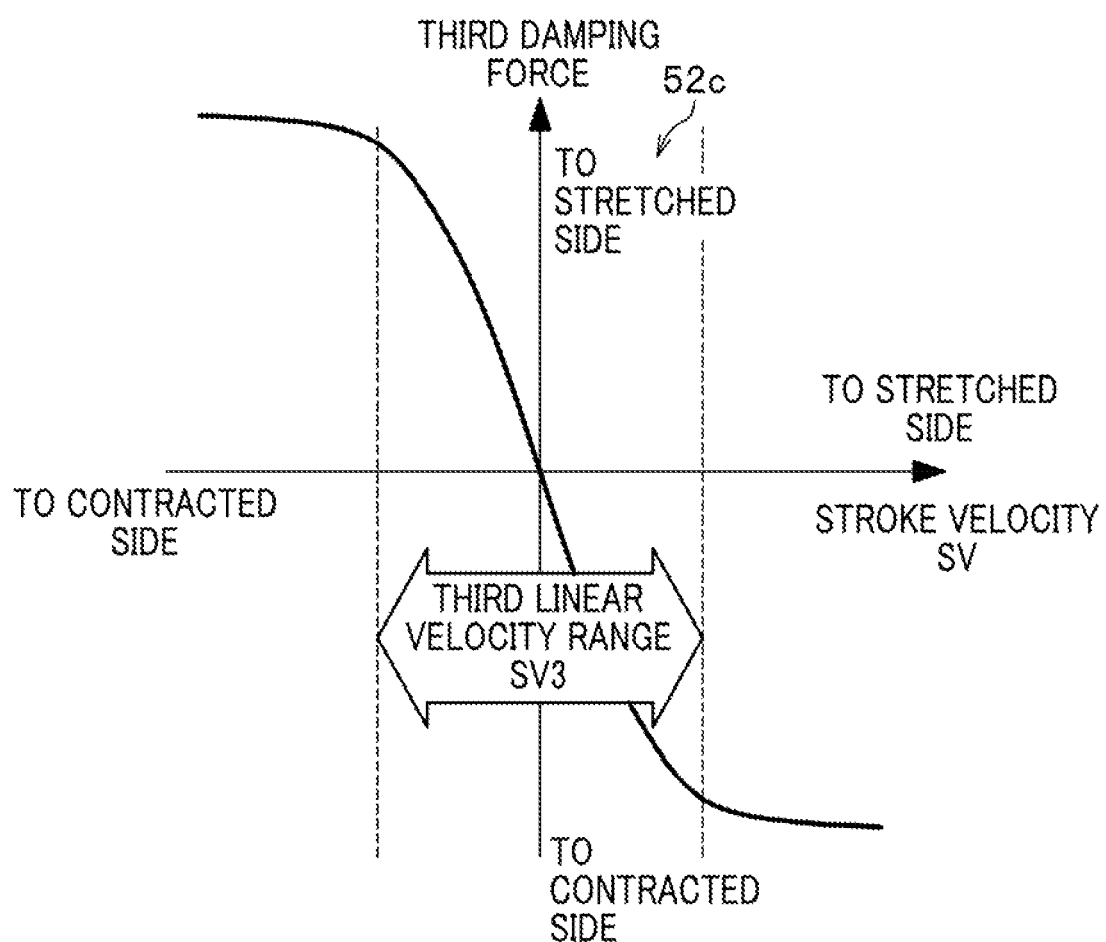

ELECTRICALLY POWERED SUSPENSION SYSTEM

CROSS-REFERENCE TO RELATED APPLICATION

This application is based upon and claims priority from the Japanese Patent Application No. 2019-61141, filed on Mar. 27, 2019, the entire contents of which are incorporated herein by reference.

BACKGROUND OF THE INVENTION

1. Field of the Invention

The present invention relates to an electrically powered suspension system which includes an electromagnetic actuator provided between a vehicle body and a wheel of a vehicle, and configured to generate drive forces for a damping operation and a telescopic operation.

2. Description of the Related Art

An electrically powered suspension system has been known which includes an electromagnetic actuator provided between a vehicle body and a wheel of a vehicle, and configured to generate drive forces for a damping operation and a telescopic operation (see, for example, Japanese Patent Application Publication No. 2010-132222, hereinafter referred to as "Patent Document 1"). The electromagnetic actuator includes an electric motor and a ball screw mechanism. The electromagnetic actuator operates to generate the drive forces for the damping operation and the telescopic operation by converting the rotary motion of the electric motor into the linear motion of the ball screw mechanism.

In this respect, the drive force for the damping operation means a damping force. The damping force is a force in a direction opposite to a direction of a stroke velocity of the electromagnetic actuator. Meanwhile, the drive force for the telescopic operation means a telescopic force. The telescopic force is a force which is generated regardless of the direction of the stroke velocity.

The electrically powered suspension system disclosed in Patent Document 1 includes a velocity-damping force map which defines a correspondence relationship between the stroke velocity and the damping force of the electromagnetic actuator. The electrically powered suspension system is designed to enhance the ride quality and driving stability of the vehicle by: calculating a target damping force corresponding to the stroke velocity of the electromagnetic actuator based on the stroke velocity and the velocity-damping force map; and controlling the drive of the electromagnetic actuator using a target drive force based on the calculated target damping force.

SUMMARY OF THE INVENTION

The electrically powered suspension system disclosed in Patent Document 1, however, involves a risk that when a switch is made from one control mode setting to another, a sudden change occurs in the drive force of the electromagnetic actuator and causes strange noise as well as disturbance of the vehicle behavior.

The present invention has been made with the above situation taken into consideration. An object thereof is to provide an electrically powered suspension system which is capable of preventing the occurrence of the strange noise and the disturbance of the vehicle behavior even when a switch is made from one control mode to another.

For the purpose of achieving the above object, an invention based on a first aspect has a major feature as follows. The invention includes: an electromagnetic actuator which is provided between a vehicle body and a wheel of a vehicle, and which generates a drive force for a damping operation; an information acquirer which acquires information about the drive force of, and control mode selection information about, the electromagnetic actuator; a setter which sets a predetermined control mode based on the control mode selection information about the electromagnetic actuator acquired by the information acquirer, and a target damping force serving as a target value of the damping operation of the electromagnetic actuator based on setting information about the control mode; and a drive controller which controls drive of the electromagnetic actuator using a target drive force based on the target damping force set by the setter. The setter performs an operation of setting the predetermined control mode while a drive force of the electromagnetic actuator acquired by the information acquirer is within a predetermined force range.

The present invention can prevent the occurrence of the strange noise and the disturbance of the vehicle behavior even when a switch is made from one control mode to another.

BRIEF DESCRIPTION OF THE DRAWINGS

FIG. 4 is a diagram conceptually illustrating the interior portion of the ECU included in the electrically powered suspension system.

FIG. 5C is an explanatory diagram of a third damping force map for a sport mode which represents a relationship between a third damping force and the stroke velocity.

DETAILED DESCRIPTION OF THE EMBODIMENTS

An electrically powered suspension system according to an embodiment of the present invention will be hereinafter described in detail with reference to the accompanying drawings depending on the necessity.

It should be noted that in the following diagrams, members having common functions will be denoted by common reference signs. In addition, sizes and shapes of members are schematically illustrated with deformation or exaggeration for the sake of explanatory convenience.

[A Basic Configuration Common Among of Electrically Powered Suspension Systems 11 According to Embodiments of the Present Invention]

Figure 1:
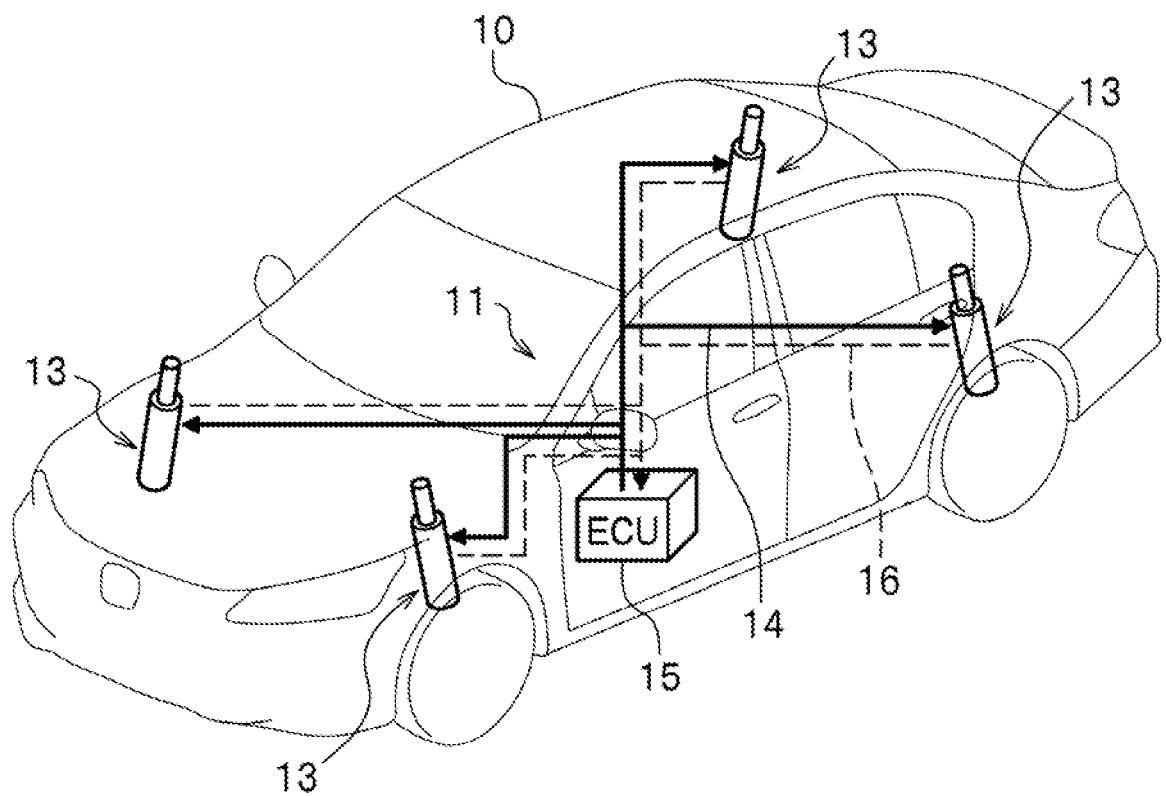
FIG. 1 is an overall configuration diagram of an electrically powered suspension system according to an embodiment of the present invention.
Figure 2:
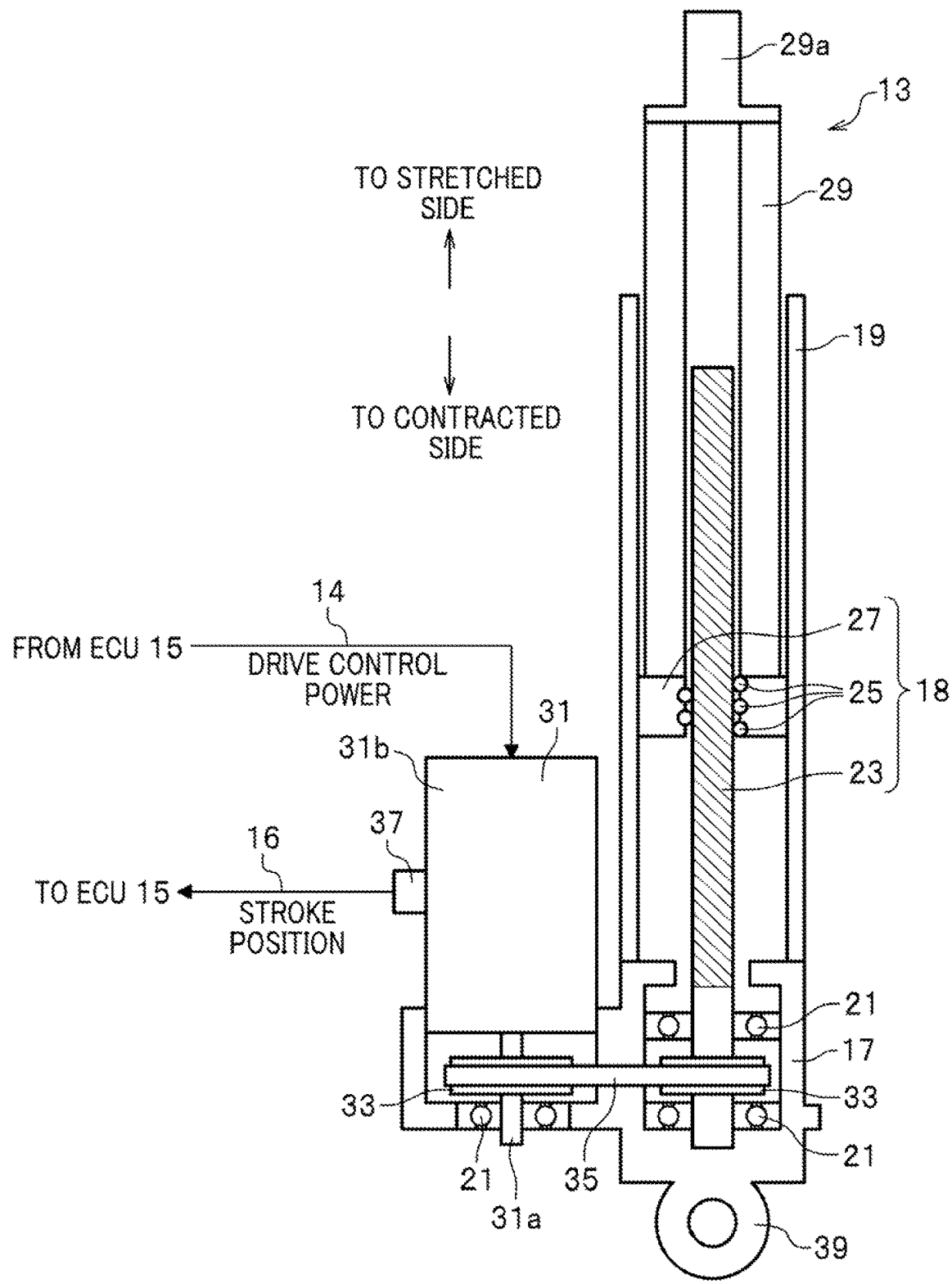
FIG. 2 is a partial cross-sectional diagram of an electromagnetic actuator included in the electrically powered suspension system.

To begin with, referring to FIGS. 1 and 2, descriptions will be provided for the basic configuration common among the electrically powered suspension systems 11 according to the embodiments of the present invention.

FIG. 1 is a diagram of the overall configuration common among the electrically powered suspension systems 11 according to the embodiments of the present invention. FIG. 2 is a partial cross-sectional diagram of an electromagnetic actuator 13 constituting apart of each electrically powered suspension systems 11.

As illustrated in FIG. 1, the electrically powered suspension system 11 according to each embodiment of the present invention includes: multiple electromagnetic actuators 13 provided to the respective wheels of a vehicle 10; and a single electronic control unit (hereinafter referred to as an "ECU") 15. The multiple electromagnetic actuators 13 and the ECU 15 are connected to one another with: electric power supply lines 14 (see solid lines in FIG. 1) which supply drive control power from the ECU 15 to the multiple electromagnetic actuators 13; and signal lines 16 (see broken lines in FIG. 1) which send rotation angle signals of electric motors 31 (see FIG. 2) from the multiple electromagnetic actuators 13 to the ECU 15, respectively.

In the embodiment, four electromagnetic actuators 13 in total are provided to the respective wheels: including front wheels (a left front wheel and a right front wheel); and rear wheels (a left rear wheel and a right rear wheel). Drives of the electromagnetic actuators 13 provided to the wheels are controlled independently of one another in response to the telescopic operations of the wheels, respectively.

In the embodiment of the present invention, the multiple electromagnetic actuators 13 include a common configuration unless otherwise indicated specifically. Descriptions of the multiple electromagnetic actuators 13, therefore, will be provided by describing the configuration of one electromagnetic actuator 13.

As illustrated in FIG. 2, the electromagnetic actuator 13 includes a base housing 17, an outer tube 19, ball bearings 21, a ball screw shaft 23, multiple balls 25, a nut 27 and an inner tube 29.

The base housing 17 supports a base end side of the ball screw shaft 23 with the ball bearings 21 in between in a way that enables the ball screw shaft 23 to rotate about its axis. The outer tube 19 is provided to the base housing 17, and contains a ball screw mechanism 18 including the ball screw shaft 23, the multiple balls 25 and the nut 27. The multiple balls 25 roll along a screw groove in the ball screw shaft 23. The nut 27 engages with the ball screw shaft 23 with the multiple balls 25 in between, and converts the rotational motion to the linear motion of the ball screw shaft 23. The inner tube 29 linked to the nut 27 displaces integrally with the nut 27 in an axial direction of the outer tube 19.

As illustrated in FIG. 2, for the purpose of transmitting a rotary drive force to the ball screw shaft 23, the electromagnetic actuator 13 includes an electric motor 31, a pair of pulleys 33 and a belt member 35. The electric motor 31 is provided to the base housing 17 in parallel to the outer tube 19. The pulleys 33 are respectively attached to a motor shaft 31a of the electric motor 31 and the ball screw shaft 23. The belt member 35 which transmits the rotary drive force of the electric motor 31 to the ball screw shaft 23 is suspended between the pair of pulleys 33.

The electric motor 31 is provided with a resolver 37 which detects the rotation angle signal of the electric motor 31. The rotation angle signal of the electric motor 31 which is detected by the resolver 37 is sent to the ECU 15 through the signal line 16. The rotary drive of the electric motor 31 is controlled in response to the drive control power which the ECU 15 supplies to a corresponding one of the multiple electromagnetic actuators 13 through a corresponding one of the electric power supply lines 14.

It should be noted that in the embodiment, the axial-direction dimension of the of the electromagnetic actuator 13 is made shorter than otherwise by employing a layout in which the motor shaft 31a of the electric motor 31 and the ball screw shaft 23 are linked together by being arranged substantially in parallel with each other, as illustrated in FIG. 2. A layout, however, may be employed in which the motor shaft 31a of the electric motor 31 and the ball screw shaft 23 are linked together by being arranged coaxially.

In the electromagnetic actuator 13 according to the embodiment, a link part 39 is provided to a lower end portion of the base housing 17, as illustrated in FIG. 2. The link part 39 is linked and fixed to a spring lower member (a wheel-side lower arm, knuckle or the like), although not illustrated. Meanwhile, an upper end part 29a of the inner tube 29 is linked and fixed to a sprung member (a vehicle body-side strut tower part or the like), although not illustrated.

In short, the electromagnetic actuator 13 is installed in parallel with the spring member provided between the vehicle body and the wheel of the vehicle 10, although not illustrated. The sprung member is provided with a sprung acceleration sensor 40 (see FIG. 3) which detects the (sprung) acceleration of the vehicle body in a stroke direction of the electromagnetic actuator 13.

The above-configured electromagnetic actuator 13 works as follows. Let us consider, for example, a case where a thrust related to upward vibration is inputted from the wheel side of the vehicle 10 into the link part 39. In this case, the inner tube 29 and the nut 27 are going to integrally descend relative to the outer tube 19 to which the thrust related to the upward vibration is applied. Thus, the ball screw shaft 23 is going to rotate in a direction corresponding to the descent of the nut 27. At this moment, the electric motor 31 generates the rotary drive force in a direction in which the rotary drive force obstructs the descent of the nut 27. The rotary drive force of the electric motor 31 is transmitted to the ball screw shaft 23 through the belt member 35.

In this way, the reaction force (damping force) against the thrust related to the upward vibration works on the ball screw shaft 23. This damps the damping force which is going to be transmitted from the wheel side to the vehicle body side.

[An Internal Configuration of the ECU 15]

Figure 3:
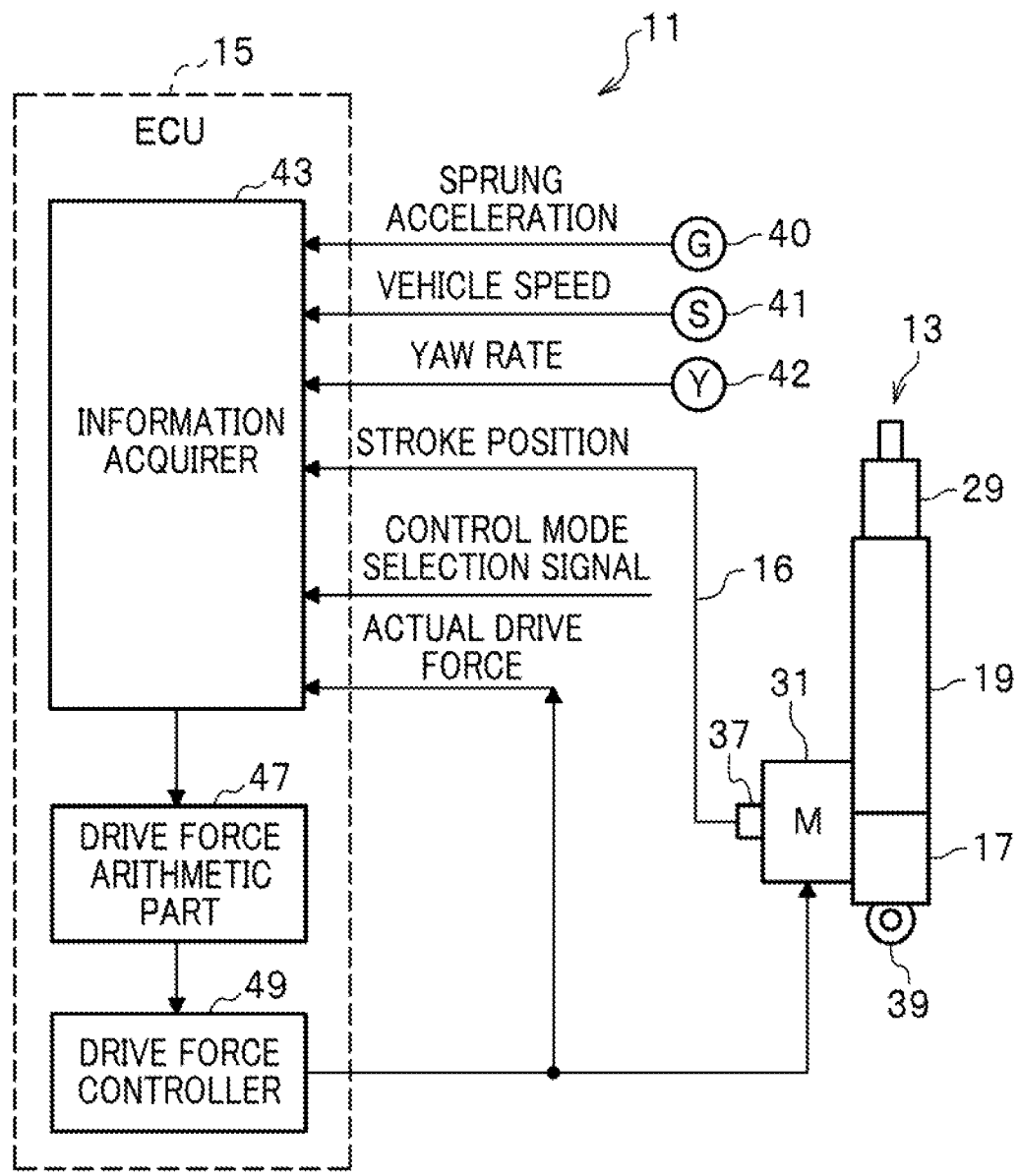
FIG. 3 is a configuration diagram of an interior portion and a peripheral portion of an ECU included in the electrically powered suspension system.
Figure 5A:
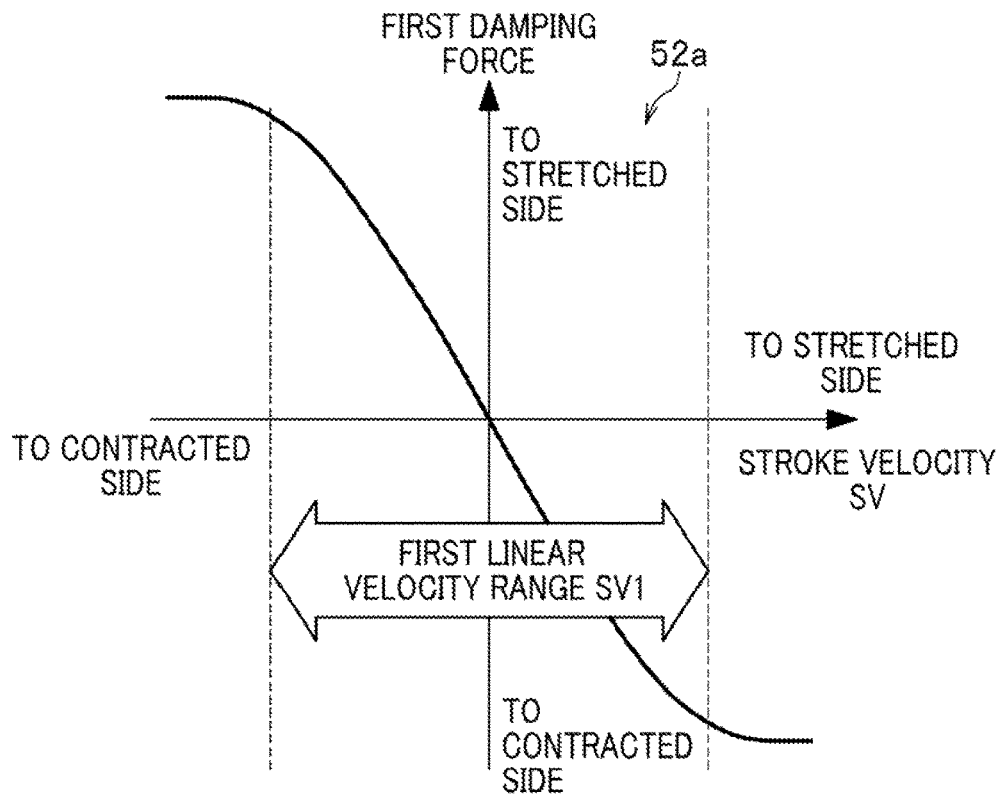
FIG. 5A is an explanatory diagram of a first damping force map for a comfort mode which represents a relationship between a first damping force and a stroke velocity.
Figure 5B:
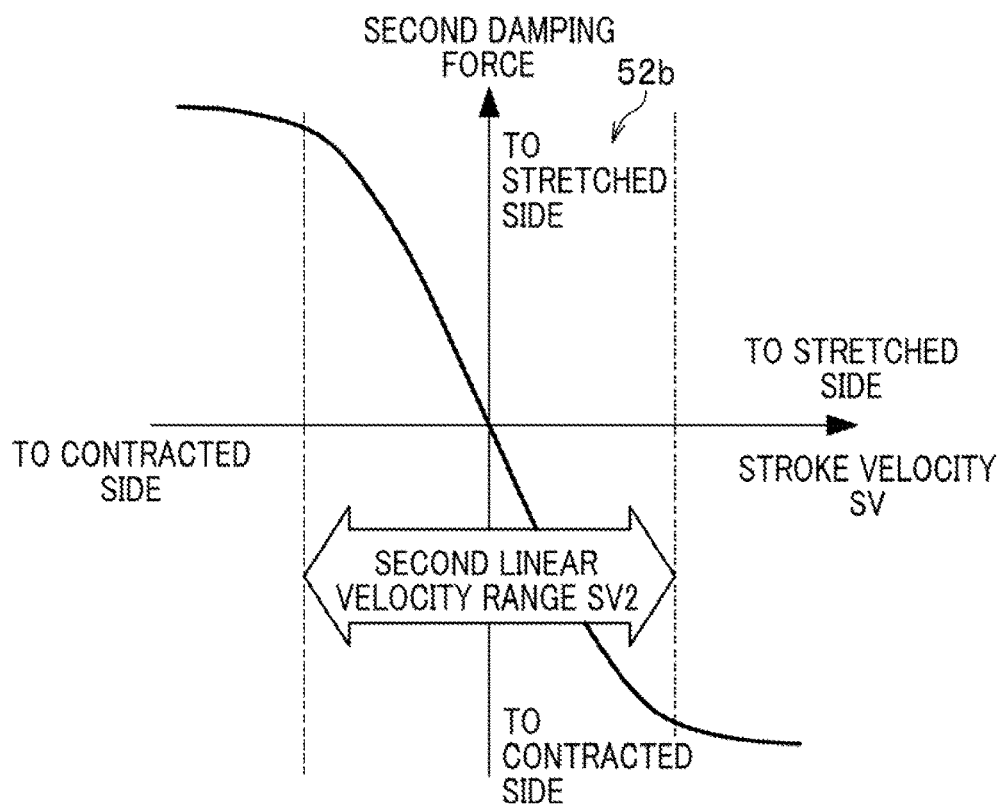
FIG. 5B is an explanatory diagram of a second damping force map for a normal mode which represents a relationship between a second damping force and the stroke velocity.

Next, referring to FIGS. 3, 4 and 5A to 5C, descriptions will be provided for an interior portion and a peripheral portion of the ECU 15 included in the electrically powered suspension system 11 according to the embodiment of the present invention. FIG. 3 is a configuration diagram of the interior portion and the peripheral portion of the ECU 15 included in the electrically powered suspension system 11 according to the embodiment of the present invention. FIG. 4 is a diagram conceptually illustrating the interior portion of the ECU 15 included in the electrically powered suspension system 11. FIG. 5A is an explanatory diagram of a first damping force map 52a for a comfort mode which represents a relationship between a first damping force and a stroke velocity SV. FIG. 5B is an explanatory diagram of a second damping force map 52b for a normal mode which represents a relationship between a second damping force and the stroke velocity SV. FIG. 5C is an explanatory diagram of a third damping force map 52c for a sport mode which represents a relationship between a third damping force and the stroke velocity SV.

The ECU 15 includes a microcomputer which performs various arithmetic processes. The ECU 15 has a drive control function of generating drive forces for a damping operation and a telescopic operation by controlling drives of the multiple electromagnetic actuators 13 based on the rotation angle signals of the electric motors 31 and the like, which are detected by the resolvers 37.

For the purpose of realizing the drive control function, the ECU 15 includes an information acquirer 43, a drive force arithmetic part 47 and a drive controller 49, as illustrated in FIG. 3.

The information acquirer 43 acquires information about the stroke velocity SV by: acquiring the rotation angle signal of the electric motor 31, detected by the resolver 37, as time-series information about a stroke position; and differentiating the time-series information about the stroke position with respect to time, as illustrated in FIG. 3.

In addition, the information acquirer 43 acquires information about a sprung velocity BV: acquiring time-series information about a sprung acceleration detected by the sprung acceleration sensor 40; and differentiating the time-series information about the sprung acceleration with respect to time, as illustrated in FIG. 3.

Furthermore, the information acquirer 43 acquires information about a vehicle speed detected by a vehicle speed sensor 41, information about a yaw rate detected by a yaw rate sensor 42, a control mode selection signal to be used to select one control mode from multiple damping force control modes and multiple telescopic force control modes, and information about an actual drive force of the electromagnetic actuator 13, as illustrated in FIG. 3.

After acquired by the information acquirer 43, the information about the stroke velocity SV, the information about the sprung velocity BV, the control mode selection signal and the information about the actual drive force of the electromagnetic actuator 13 are sent to the drive force arithmetic part 47.

As illustrated in FIG. 4, the drive force arithmetic part 47 includes a damping force setter 51, a telescopic force setter 53, a drive force determination part 55 and an adder 57. The drive force arithmetic part 47 corresponds to a "setter" of the present invention.

The drive force arithmetic part 47 basically has a function of: setting a target damping force serving as a target value of the damping operation of the electromagnetic actuator 13, and a target telescopic force serving as a target value of the telescopic operation of the electromagnetic actuator 13; and acquiring driving forces for the damping operation and the telescopic operation of the electromagnetic actuator 13 for the purpose of realizing the thus-set target damping and telescopic forces.

To put it in detail, the drive force arithmetic part 47 sets a damping force control mode and a telescopic force control mode of the electromagnetic actuator 13 based on the control selection information about the electromagnetic actuator 13. The control selection information about the electromagnetic actuator 13 is information to be used to selectively instruct control modes (one of the damping force control modes and one of the telescopic force control modes) of the electromagnetic actuator 13 based on the driver's instruction manipulation.

Examples of the control modes (the damping force control modes and the telescopic force control modes) of the electromagnetic actuator 13 includes: the comfort mode in which a comfortable ride quality is offered with suppressed vibrations inside a vehicle compartment; the normal mode in which a standard ride quality is offered; and the sport mode in which driving stability of the vehicle 10 is prioritized over the ride quality.

The drive force arithmetic part 47 sets the target damping force serving as the target value of the damping operation of the electromagnetic actuator 13 and the target telescopic force serving as the target value of the telescopic operation of the electromagnetic actuator 13 based on control mode setting information (for example, information about the setting of the comfort mode as one of the control mode).

Specifically, as illustrated in FIG. 4, the drive force arithmetic part 47 includes a damping force setter 51 which sets one of the damping forces corresponding respectively to the comfort mode, the normal mode and the sport mode serving as the control modes. The damping force setter 51 includes first to third damping force maps 52a, 52b, 52c.

As illustrated in FIGS. 5A to 5C, for the control modes, respectively, the first to third damping force maps 52a, 52b, 52c store values of first to third damping forces which change in association with changes in the stroke velocity SV. Incidentally, the values of the first to third damping forces are actually stored as target values of a damping force control current.

First damping force characteristics related to the comfort mode are associated with the first damping force map 52a. Second damping force characteristics related to the normal mode are associated with the second damping force map 52b. Third damping force characteristics related to the sport mode are associated with the third damping force map 52c.

The first damping force characteristics related to the comfort mode include a first linear velocity range SV1 in which the first damping force changes substantially linearly in response to changes in the stroke velocity SV, as illustrated in FIG. 5A. The first damping force characteristics in the first linear velocity range SV1 include a characteristic in which: the first damping force in a direction to the contracted side becomes substantially linearly larger as the stroke velocity SV becomes larger in a direction to the stretched side; and the first damping force in the direction to the stretched side becomes substantially linearly larger as the stroke velocity SV becomes larger in the direction to the contracted side. Incidentally, when the stroke velocity SV is at 0, the corresponding first damping force is also at 0.

Like the first damping force characteristics, the second damping force characteristics related to the normal mode include a second linear velocity range SV2 in which the second damping force changes substantially linearly in response to changes in the stroke velocity SV, as illustrated in FIG. 5B. The second damping force characteristics in the second linear velocity range SV2 include a characteristic in which: the second damping force in the direction to the contracted side becomes substantially linearly larger as the stroke velocity SV becomes larger in the direction to the stretched side; and the second damping force in the direction to the stretched side becomes substantially linearly larger as the stroke velocity SV becomes larger in the direction to the contracted side. Incidentally, when the stroke velocity SV is at 0, the corresponding second damping force is also at 0.

Like the first and second damping force characteristics, the third damping force characteristics related to the sport mode include a third linear velocity range SV3 in which the third damping force changes substantially linearly in response to changes in the stroke velocity SV, as illustrated in FIG. 5C. The third damping force characteristics in the third linear velocity range SV3 include a characteristic in which: the third damping force in the direction to the contracted side becomes substantially linearly larger as the stroke velocity SV becomes larger in the direction to the stretched side; and the third damping force in the direction to the stretched side becomes substantially linearly larger as the stroke velocity SV becomes larger in the direction to the contracted side. Incidentally, when the stroke velocity SV is at 0, the corresponding third damping force is also at 0.

The inclination of the second damping force characteristics in the second linear velocity range SV2 (see FIG. 5B) is set steeper than that of the first damping force characteristics in the first linear velocity range SV1 (see FIG. 5A).

Similarly, the inclination of the third damping force characteristics in the third linear velocity range SV3 (see FIG. 5C) is set steeper than that of the second damping force characteristics in the second linear velocity range SV2 (see FIG. 5B).

A velocity change width in the second linear velocity range SV2 (see FIG. 5B) is set narrower than that in the first linear velocity range SV1 (see FIG. 5A).

Similarly, a velocity change width in the third linear velocity range SV3 (see FIG. 5C) is set narrower than that in the second linear velocity range SV2 (see FIG. 5B).

The damping force setter 51 included in the drive force arithmetic part 47 sets the value of the damping force corresponding to the stroke velocity SV at the moment as the target damping force, by use of the damping force map 52 based on the control mode setting information by selecting one from the first to third damping force maps 52a, 52b, 52c which are map variations of the damping force map 52.

Meanwhile, as illustrated in FIG. 4, the drive force arithmetic part 47 includes the telescopic force setter 53 which sets one of the telescopic forces corresponding respectively to the comfort mode, the normal mode and the sport mode serving as the control modes. The telescopic force setter 53 includes first to third telescopic force maps 54a, 54b, 54c.

For the respective control modes, respectively, the first to third telescopic force maps 54a, 54b, 54c store the values of the target telescopic forces which change in association with changes in the sprung acceleration BV. Incidentally, the values of the target telescopic forces are actually stored as target values of a telescopic force control current.

First telescopic force characteristics related to the comfort mode are associated with the first telescopic force map 54a. Second telescopic force characteristics related to the normal mode are associated with the second telescopic force map 54b. Third telescopic force characteristics related to the sport mode are associated with the third telescopic force map 54c. Incidentally, a relationship between the first to third telescopic force characteristics and the present invention is weak, and their attachment is omitted.

The telescopic force setter 53 included in the drive force arithmetic part 47 sets the value of the telescopic force corresponding to the sprung velocity BV at the moment as the target telescopic force, by use of a telescopic force map 54 based on the control mode setting information by selecting one from the first to third telescopic force maps 54a, 54b, 54c which are map variations 54a, 54b, 54c of the telescopic force map 54.

A predetermined force range FA is set in the drive force determination part 55 included in the drive force arithmetic part 47. For the purpose of preventing the drive force of the electromagnetic actuator 13 from suddenly changing when a switch is made from one control mode to another, an appropriate range acquired through an experiment, a simulation or the like may be set as the predetermined force range FA.

The drive force determination part 55 performs a drive force determination on whether the actual drive force Fdr of the electromagnetic actuator 13 acquired by the information acquirer 43 falls within the predetermined force range FA.

In a case where as a result of the drive force determination, the drive force determination part 55 determines that the actual drive force Fdr of the electromagnetic actuator 13 falls within the predetermined force range FA, the drive force determination part 55 sends a setting operation permission signal for permitting the setting operation based on the control mode setting information, to the damping force setter 51 and the telescopic force setter 53.

In short, the drive force arithmetic part 47 performs the setting switch operation based on the control mode setting information while the actual drive force Fdr of the electromagnetic actuator 13 acquired by the information acquirer 43 is within the predetermined force range FA.

This prevents a situation which would otherwise cause strange noise and behavior disturbance of the vehicle due to a sudden change in the drive force of the electromagnetic actuator 13 when the switch is made from one control mode to another.

As illustrated in FIG. 4, the adder 57 included in the drive force arithmetic part 47 acquires the target drive force by summing up the target damping force set by the damping force setter 51 and the target telescopic force set by the telescopic force setter 53, and acquires a drive control signal for realizing the target drive force through an arithmetic operation. The drive control signal as the result of the arithmetic operation performed by the drive force arithmetic part 47 is sent to the drive controller 49.

Based on the drive control signal sent from the drive force arithmetic part 47, the drive controller 49 controls the drives of the multiple electromagnetic actuators 13 independently of one another by supplying the drive control powers to the electric motors 31 provided to the multiple electromagnetic actuators 13, respectively.

It should be noted that, for example, an inverter control circuit may be appropriately used to generate drive control power to be supplied to the electric motor 31.

[How the Electrically Powered Suspension Systems 11 According to the Embodiments of the Present Invention Works]

Figure 6:
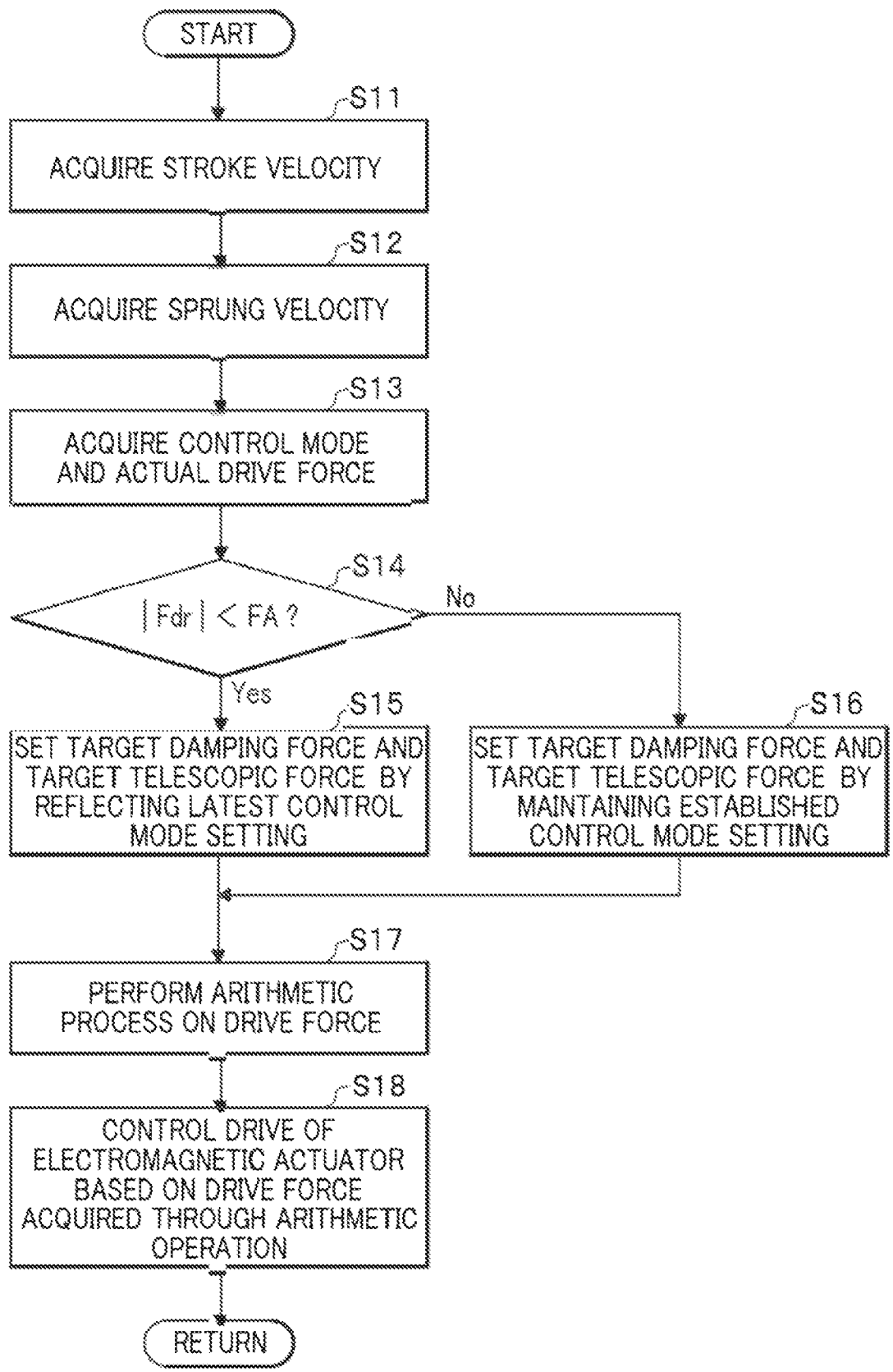
FIG. 6 is a flowchart diagram used to explain how the electrically powered suspension system according to the embodiment of the present invention works.

Next, referring to FIG. 6, descriptions will be provided for how the electrically powered suspension system 11 according to each embodiment of the present invention works. FIG. 6 is a flowchart diagram used to explain how the electrically powered suspension system 11 according to the embodiment of the present invention works.

In step S11 (a stroke velocity acquiring step) illustrated in FIG. 6, the information acquirer 43 of the ECU 15 acquires the information about the stroke velocity SV by: acquiring the rotation angle signal of the electric motor 31, detected by the resolver 37, as the time-series information about the stroke position; and differentiating the time-series information about the stroke position with respect to time. The thus-acquired information about the stroke velocity SV is sent to the drive force arithmetic part 47.

In step S12 (a sprung velocity acquiring step), the information acquirer 43 of the ECU 15 acquires the information about the sprung velocity BV by: acquiring the time-series information about the sprung acceleration detected by the sprung acceleration sensor 40; and differentiating the time-series information about the sprung acceleration with respect to time. The thus-acquired information about the sprung velocity BV is sent to the drive force arithmetic part 47.

In step S13 (a control mode and actual drive force acquiring step), the information acquirer 43 of the ECU 15 acquires the control mode selection signal representing the information about the damping force control mode selection and the telescopic force control mode selection, as well as the information about the actual drive force of the electromagnetic actuator 13.

In step S14, the drive force determination part 55 included in the drive force arithmetic part 47 of the ECU 15 performs the drive force determination on whether the actual drive force Fdr of the electromagnetic actuator 13 acquired in step S13 falls within the predetermined force range FA (whether |Fdr|<FA).

If the result of the drive force determination performed in step S14 is that the actual drive force Fdr of the electromagnetic actuator 13 falls within the predetermined force range FA (if Yes in step S14), the ECU 15 makes the process flow proceed to the next step S15. In addition, the drive force determination part 55 included in the drive force arithmetic part 47 of the ECU 15 sends the setting operation permission signal for permitting the setting operation based on the control mode setting information, to the damping force setter 51 and the telescopic force setter 53.

On the other hand, if the result of the drive force determination performed in step S14 is that the actual drive force Fdr of the electromagnetic actuator 13 does not fall within the predetermined force range FA (if No in step S14), the ECU 15 makes the process flow jump to step S16.

If the result of the drive force determination performed in step S14 is that the actual drive force Fdr of the electromagnetic actuator 13 falls within the predetermined force range FA, the drive force arithmetic part 47 of the ECU 15 sets the target damping force and the target telescopic force by reflecting the latest control mode setting in step S15.

In other words, upon receipt of the setting operation permission signal sent from the drive force determination part 55, the damping force setter 51 and the telescopic force setter 53 included in the drive force arithmetic part 47 of the ECU 15 perform the setting switch operation based on the control mode setting information while the actual drive force Fdr of the electromagnetic actuator 13 acquired by the information acquirer 43 is within the predetermined force range FA.

In other words, the damping force setter 51 included in the drive force arithmetic part 47 of the ECU 15 sets the value of the damping force corresponding to the stroke velocity SV at the moment as the target damping force, by use of the damping force map 52 based on the setting information about the control mode selection signal acquired in step S13 by selecting one from the first to third damping force maps 52a, 52b, 52c which are the map variations of the damping force map 52.

In addition, the telescopic force setter 53 included in the drive force arithmetic part 47 of the ECU 15 sets the value of the telescopic force corresponding to the sprung velocity BV at the moment as the target telescopic force, by use of the telescopic force map 54 based on the control mode setting information about the control mode selection signal acquired in step S13 by selecting one from the first to third telescopic force maps 54a, 54b, 54c which are the map variations 54a, 54b, 54c of the telescopic force map 54.

If the result of the drive force determination performed in step S14 is that the actual drive force Fdr of the electromagnetic actuator 13 does not fall within the predetermined force range FA, the drive force arithmetic part 47 of the ECU 15 sets the target damping force and the target telescopic force by maintaining the established control mode setting in step S16.

In step 17 (a drive force arithmetic process step), the adder 57 including in the drive force arithmetic part 47 of the ECU 15 acquires the target drive force by summing up the target damping force set in step S15 or S16 by the damping force setter 51 and the target telescopic force set in step S15 or S16 by the telescopic force setter 53, and acquires the drive control signal for realizing the target drive force through an arithmetic operation.

In step S18, the drive controller 49 of the ECU 15 controls the drives of the multiple electromagnetic actuators 13 by supplying the drive control powers to the electric motors 31 provided to the electromagnetic actuators 13 based on the drive control signals acquired through the arithmetic process in step S17, respectively.

[An Internal Configuration of an ECU 15 Included in an Electrically Powered Suspension System 11 According to a Modification of the Embodiment of the Present Invention]

Figure 7:
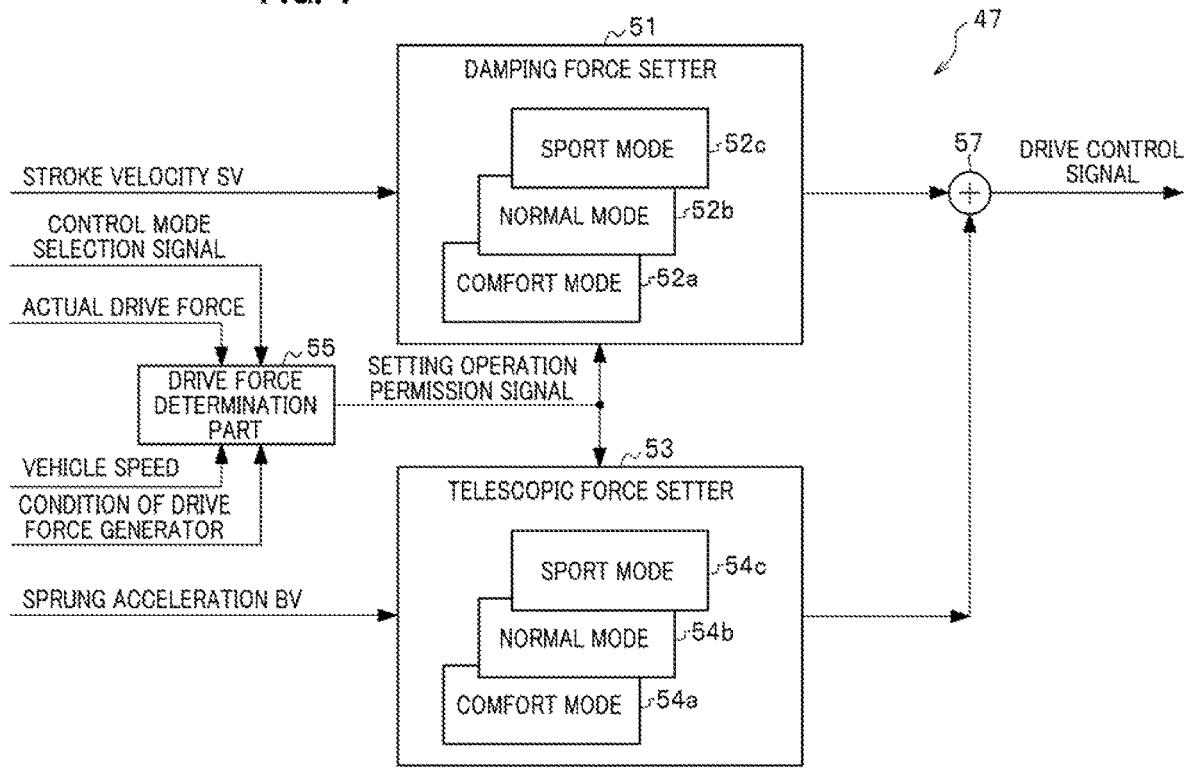
FIG. 7 is a diagram conceptually illustrating an interior portion of an ECU included in an electrically powered suspension system according to a modification.

Next, referring to FIG. 7, descriptions will be provided for the internal configuration of the ECU 15 included in the electrically powered suspension system 11 according to the modification of the embodiment of the present invention. FIG. 7 is a diagram conceptually illustrating the interior portion of the ECU 15 included in the electrically powered suspension system 11 according to the modification of the embodiment of the present invention.

The configuration of the electrically powered suspension system 11 according to the embodiment of the present invention which is illustrated in FIG. 4 and the configuration of the electrically powered suspension system 11 according to the modification of the embodiment of the present invention which is illustrated in FIG. 7 are common in many parts.

The configuration of the electrically powered suspension system 11 according to the modification of the embodiment of the present invention, therefore, will be described by explaining mainly what makes the electrically powered suspension system 11 according to the modification of the embodiment of the present invention different from the electrically powered suspension system 11 according to the embodiment of the present invention.

The electrically powered suspension system 11 according to the modification of the embodiment of the present invention is different from the electrically powered suspension system 11 according to the embodiment of the present invention in that: the information acquirer 43 acquires further information about the vehicle speed and information about the condition of a drive force generator (not illustrated) which generates the drive force of the vehicle 10; and the information about the vehicle speed and the information about the condition of the drive force generator which are acquired by the information acquirer 43 are inputted into the drive force determination part 55 included in the drive force arithmetic part 47 of the ECU 15.

[Working and Effects of the Electrically Powered Suspension System 11 According to the Embodiment of the Present Invention]

The electrically powered suspension system 11 based on a first aspect includes: the electromagnetic actuator 13 which is provided between the vehicle body and the wheel of the vehicle 10, and which generates the drive force for the damping operation; the information acquirer 43 which acquires the information about the drive force of, and the control mode selection information about, the electromagnetic actuator 13; the drive force arithmetic part (setter) 47 which sets the predetermined control mode based on the control mode selection information about the electromagnetic actuator 13 acquired by the information acquirer 43, and sets the target damping force serving as the target value of the damping operation of the electromagnetic actuator 13 based on the setting information about the control mode; and the drive controller 49 which controls the drive of the electromagnetic actuator 13 using the target drive force based on the target damping force set by the drive force arithmetic part 47.

The drive force arithmetic part (setter) 47 performs the operation of setting the predetermined control mode while the drive force Fdr of the electromagnetic actuator 13 acquired by the information acquirer 43 is within the predetermined force range FA.

In the electrically powered suspension system 11 based on the first aspect, the drive force arithmetic part 47 performs the operation of setting the predetermined control mode while the drive force Fdr of the electromagnetic actuator 13 acquired by the information acquirer 43 is within the predetermined force range FA.

In this respect, the operation of setting the control mode includes not only the setting (including both the mere setting and the switch setting) of the control mode, but also the operation of setting the target damping force of the electromagnetic actuator 13 based on the control mode setting information (this setting operation enables the drive of the electromagnetic actuator 13 to be actually controlled based on the target damping force).

In addition, the period while the drive force Fdr of the electromagnetic actuator 13 is within the predetermined force range FA is defined as a period while no sudden change occurs in the drive force of the electromagnetic actuator 13 at time of switching the control mode setting from one to another even if the switch is made.

Furthermore, the performing of the operation of setting the predetermined control mode while the drive force Fdr of the electromagnetic actuator 13 acquired by the information acquirer 43 is within the predetermined force range FA means that the performing of the operation of setting the predetermined control mode waits for the drive force Fdr of the electromagnetic actuator 13 to fall within the predetermined force range FA.

The electrically powered suspension system 11 based on the first aspect performs the operation of setting the control mode while the drive force Fdr of the electromagnetic actuator 13 is within the predetermined force range FA. The electrically powered suspension system 11, therefore, causes no sudden change in the drive force of the electromagnetic actuator 13 even when switching the control mode setting from one to another. Thus, the electrically powered suspension system 11 can prevent the occurrence of the strange noise and the disturbance of the vehicle behavior.

The electrically powered suspension system 11 based on a second aspect includes: the electromagnetic actuator 13 which is provided between the vehicle body and the wheel of the vehicle 10, and which generates the drive forces for the damping operation and the telescopic operation; the information acquirer 43 which acquires the information about the drive forces of, and the control mode selection information about, the electromagnetic actuator 13; the drive force arithmetic part (setter) 47 which sets the predetermined control mode based on the control mode selection information about the electromagnetic actuator 13 acquired by the information acquirer 43, and sets the target damping force serving as the target value of the damping operation of the electromagnetic actuator 13 and the target telescopic force serving as the target value of the telescopic operation of the electromagnetic actuator 13, based on the setting information about the control mode; and the drive controller 49 which controls the drive of the electromagnetic actuator 13 using the target drive force based on the target damping and telescopic forces set by the drive force arithmetic part 47.

The drive force arithmetic part (setter) 47 performs the operation of switching the setting of the predetermined control mode from one to another while the drive force Fdr of the electromagnetic actuator 13 acquired by the information acquirer 43 is within the predetermined force range FA.

The electrically powered suspension system 11 based in the second aspect is different from the electrically powered suspension system 11 based on the first aspect in that: the former refers to the electromagnetic actuator 13 which generates the drive forces for the damping operation and the telescopic operation; the drive force arithmetic part (setter) 47 sets the target damping force and the target telescopic force; and the drive force arithmetic part (setter) 47 performs the operation of switching the setting of the predetermined control mode from one to another.

In other words, the electrically powered suspension system 11 based in the second aspect, the drive force arithmetic part 47 performs the operation of switching the setting of the predetermined control mode from one to another while at least one of the drive force Fdr of the electromagnetic actuator 13 acquired by the information acquirer 43, the target drive force, the target damping force and the target telescopic force is within the predetermined force range FA.

In this respect, the operation of switching the setting of the control mode from one to another includes not only the switching of the setting of the control mode from one to another, but also the operation of switching the setting of the target damping and telescopic forces of the electromagnetic actuator 13 based on the control mode setting information (this operation of switching the setting from one to another enables the drive of the electromagnetic actuator 13 to be actually controlled based on at least one of the target damping force and the target telescopic force).

In addition, the period while at least one of the drive force Fdr of the electromagnetic actuator 13, the target drive force, the target damping force and the target telescopic force is within the predetermined force range FA is defined as a period while no sudden change occurs in the drive force of the electromagnetic actuator 13 even when the control mode setting is switched from one to another.

The electrically powered suspension system 11 based on the second aspect performs the operation of switching the setting of the control mode from one to another while at least one of the drive force Fdr of the electromagnetic actuator 13, the target drive force, the target damping force and the target telescopic force is within the predetermined force range FA. The electrically powered suspension system 11, therefore, causes no sudden change in the drive force of the electromagnetic actuator 13 even when switching the control mode setting from one to another. Thus, the electrically powered suspension system 11 can prevent the occurrence of the strange noise and the disturbance of the vehicle behavior.

Furthermore, the electrically powered suspension system 11 based on a third aspect is the electrically powered suspension system 11 based on the second aspect in which: the information acquirer 43 acquires further the information about the stroke velocity SV of the electromagnetic actuator 13, and the information about the sprung velocity BV; the drive force arithmetic part (setter) 47 sets the target damping force based on the information about the damping force control mode and the information about the stroke velocity SV acquired by the information acquirer 43, and sets the target telescopic force based on the information about the telescopic force control mode and the information about the sprung velocity BV acquired by the information acquirer 43, as well as performs the operation of switching the setting of the damping force control mode from one to another, and the operation of switching the setting of the telescopic force control mode, in mutually different timings.

The electrically powered suspension system 11 based on the third aspect can perform the operation of switching the setting of the damping force control mode from one to another, and the operation of switching the setting of the telescopic force control mode, in their respective suitable timings.

In addition, the electrically powered suspension system 11 based on a fourth aspect is the electrically powered suspension system 11 based on the second or third aspect, and may employ a configuration in which: the information acquirer 43 acquires further the information about the vehicle speed VS; and the drive force arithmetic part (setter) 47 controls the width of the force range FA based on the vehicle speed VS acquired by the information acquirer 43. The electrically powered suspension system 11 based on the fourth aspect corresponds to the electrically powered suspension system 11 (see FIG. 7) according to the modification of the embodiments of the present invention.

Figure 8A:
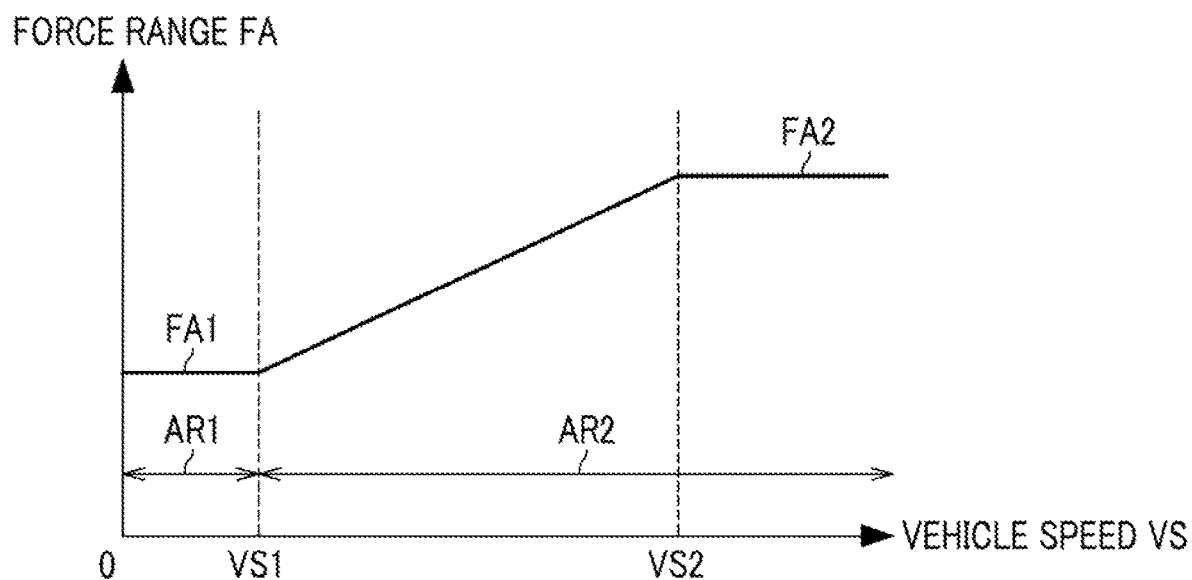
FIG. 8A is a diagram used to explain how the electrically powered suspension system according to the modification works.

Referring to FIG. 8A, descriptions will be provided for how the electrically powered suspension system 11 based on the fourth aspect works. FIG. 8A is a diagram used to explain how the electrically powered suspension system 11 according to the modification of the embodiments of the present invention works.

In the electrically powered suspension system 11 based on the fourth aspect, the drive force arithmetic part 47 controls the width of the force range FA based on the vehicle speed VS.

Specifically, for example, noise which the vehicle 10 makes while running in a case where the vehicle speed VS is in a low vehicle speed range (including the stop) AR1 (VS<VS1) is smaller than noise which the vehicle 10 makes while running in a case where the vehicle speed VS is in a middle-high vehicle speed range AR2 (VS→VS1). When, therefore, the setting of the control mode is switched from one to another, higher quietness is required in the case where the vehicle speed VS is in the low vehicle speed range AR1 than in the case where the vehicle speed VS is in the middle-high vehicle speed range AR2. On the other hand, noise which the vehicle 10 makes while running in the case where the vehicle speed VS is in the middle-high vehicle speed range AR2 is larger than noise which the vehicle 10 makes while running in the case where the vehicle speed VS is in the low vehicle speed range AR1. For this reason, when the setting of the control mode is switched from one to another, higher convenience (the satisfaction of the need for switching the setting of the control mode quickly) over the quietness is required in the case where the vehicle speed VS is in the middle-high vehicle speed range AR2 than in the case where the vehicle speed VS is in the low vehicle speed range AR1.

With this taken into consideration, in the electrically powered suspension system 11 based on the fourth aspect, the drive force arithmetic part 47 performs control to make the force range FA in the case where the vehicle speed VS is in the low vehicle speed range AR1 narrower than the force range FA in the case where the vehicle speed VS is in the middle-high vehicle speed range AR2.

Incidentally, in the example illustrated in FIG. 8A, the force range FA in the case where the vehicle speed VS is in the low vehicle speed range AR1 is set at a fixed value FA1; the force range FA in the case where the vehicle speed VS is in a middle vehicle speed range (VS1=<VS<VS2) is set at (FA2−FA1, where FA1<FA2); and the force range FA in the case where the vehicle speed VS is in the high vehicle speed range is set at a fixed value FA2.

Thus, the operation of switching the setting of the predetermined control mode from one to another is performed while the drive force Fdr of the electromagnetic actuator 13 is small enough to fall within the force range FA controlled to become narrower in the case where the vehicle speed VS is in the low vehicle speed range AR1 (in the case where higher quietness is required when the setting of the control mode is switched from one to another, since the noise which the vehicle 10 makes while running is small) than in the case where the vehicle speed VS is in the middle-high vehicle speed range AR2.

The setting of the control mode therefore can be quietly switched from one to another in the case where the vehicle speed VS is in the low vehicle speed range AR1.

On the other hand, in the electrically powered suspension system 11 based on the fourth aspect, the drive force arithmetic part 47 performs control to make the force range FA in the case where the vehicle speed VS is in the middle-high vehicle speed range AR2 wider than the force range FA in the case where the vehicle speed VS is in the low vehicle speed range AR1.

Thus, the operation of switching the setting of the predetermined control mode from one to another is performed while the drive force Fdr of the electromagnetic actuator 13 is small enough to fall within the force range FA controlled to become wider in the case where the vehicle speed VS is in the middle-high vehicle speed range AR2 (in the case where higher convenience over the quietness is required) than in the case where the vehicle speed VS is in the low vehicle speed range AR1. The setting of the control mode therefore can be more quickly switched from one to another in the case where the vehicle speed VS is in the middle-high vehicle speed range AR2 than in the case where the vehicle speed VS is in the low vehicle speed range AR1. Accordingly, the convenience can be enhanced much more.

In the electrically powered suspension system 11 based on the fourth aspect, the drive force arithmetic part (setter) 47 controls the width of the force range FA based on the vehicle speed VS. It can be therefore expected that the electrically powered suspension system 11 based on the fourth aspect brings about the effect of quietly or quickly switching the setting of the control mode from one to another corresponding to the vehicle speed VS, in addition to the working and effects of the electrically powered suspension system 11 based on the second or third aspect.

Besides, the electrically powered suspension system 11 based on a fifth aspect is the electrically powered suspension system 11 based on the second or third aspect, and may employ a configuration in which: the information acquirer 43 acquires further the information about the condition of the drive force generator which generates the drive force of the vehicle 10; and the drive force arithmetic part (setter) 47 controls the width of the force range FA based on the condition of the drive force generator acquired by the information acquirer 43. The electrically powered suspension system 11 based on the fifth aspect corresponds to the electrically powered suspension system 11 (see FIG. 7) according to the modification of the embodiment of the present invention.

Figure 8B:
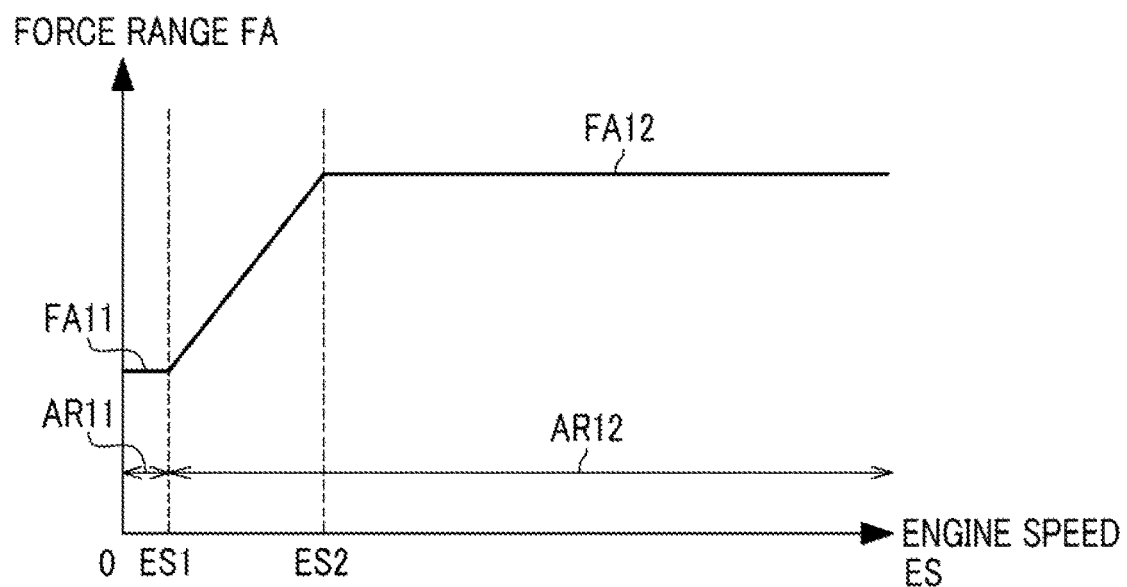
FIG. 8B is a diagram used to explain how the electrically powered suspension system according to the modification works.

Referring to FIG. 8B, descriptions will be provided for how the electrically powered suspension system 11 based on the fifth aspect works. FIG. 8B is a diagram used to explain how the electrically powered suspension system 11 according to the modification of the embodiment of the present invention works.

In the electrically powered suspension system 11 based on the fifth aspect, the drive force arithmetic part 47 controls the width of the force range FA based on the condition of the drive force generator.

Specifically, for example, in a case where the vehicle 10 is a hybrid vehicle, noise which the vehicle 10 makes while running is smaller in an area AR11 (an area in which the engine speed ES is less than ES1, that is to say, ES<ES1) where the condition of the drive force generator is an EV mode (mainly on a low speed side) of generating the drive force using an electric motor than in an area AR12 (an area in which the engine speed ES is equal to or greater than ES1, that is to say, ES>=ES1) where the condition of the drive force generator is an engine drive mode (mainly on a high speed side) of generating the drive force using an internal combustion engine. For this reason, when the setting of the control mode is switched from one to another, higher quietness is required in the area AR11 where the condition of the drive force generator is the EV mode than in the area AR12 where the condition of the drive force generator is the engine drive mode.

On the other hand, the noise which the vehicle 10 makes while running is larger in the area AR12 where the condition of the drive force generator is the engine drive mode than in the area AR11 where the condition of the drive force generator is the EV mode. For this reason, when the setting of the control mode is switched from one to another, higher convenience (the satisfaction of the need for quickly switching the setting of the control mode from one to another) over the quietness is required in the area AR12 where the condition of the drive force generator is the engine drive mode than in the area AR11 where the condition of the drive force generator is the EV mode.

With this taken into consideration, in the electrically powered suspension system 11 based on the fifth aspect, the drive force arithmetic part 47 performs the control to make the force range FA in the case (the area AR11) where the condition of the drive force generator is the EV mode narrower than the force range FA in the case (the area AR12) where the condition of the drive force generator is the engine drive mode.

Incidentally, in the example illustrated in FIG. 8B, the force range FA in the area AR11 (ES<ES1) where the condition of the drive force generator is the EV mode is set at a fixed value AF11; the force range FA in an area where the engine speed ES is not less than ES1 but less than ES2 within the area AR12 where the condition of the drive force generator is the engine drive mode is set at (F12−FA11, where FA11<FA12); and the force range FA in an area where the engine speed ES is greater than ES2 within the area AR12 where the condition of the drive force generator is the engine drive mode is set at a fixed value FA12.

Thus, the operation of switching the setting of the predetermined control mode is switched while the drive force Fdr of the electromagnetic actuator 13 is small enough to fall within the force range FA controlled to become narrower in the case (the area AR11) where the condition of the drive force generator is the EV mode (in the case where higher quietness is required when the setting of the control mode is switched from one to another, since the noise which the vehicle 10 makes while running is small) than in the case (the area AR12) where the condition of the drive force generator is the engine drive mode.

The setting of the control mode therefore can be quietly switched from one to another in the case where the condition of the drive force generator is the EV mode.

On the other hand, in the electrically powered suspension system 11 based on the fifth aspect, the drive force arithmetic part 47 performs control to make the force range FA in the case (the area AR12) where the condition of the drive force generator is the engine drive mode wider than the force range FA in the case (the area AR11) where the condition of the drive force generator is the EV mode.

Thus, the operation of switching the setting of the predetermined control mode from one to another is performed while the drive force Fdr of the electromagnetic actuator 13 is small enough to fall within the force range FA controlled to become wider in the case (the area AR12) where the condition of the drive force generator is the engine drive mode (in the case where higher convenience over the quietness is required) than in the case (the area AR11) where the condition of the drive force generator is the EV mode.

The setting of the control mode therefore can be more quickly switched from one to another in the case (the area AR12) where the condition of the drive force generator is the engine drive mode than in the case (the area AR11) where the condition of the drive force generator is the EV mode. Accordingly, the convenience can be enhanced much more.

In the electrically powered suspension system 11 based on the fifth aspect, the drive force arithmetic part (setter) 47 controls the width of the force range FA based on the condition of the drive force generator. It can be therefore expected that the electrically powered suspension system 11 based on the fifth aspect brings about the effect of quietly or quickly switching the setting of the control mode from one to another corresponding to the condition of the drive force generator, in addition to the working and effects of the electrically powered suspension system 11 based on the second or third aspect.

OTHER EMBODIMENTS

The multiple embodiments discussed above are examples of how the present invention is embodied. These shall not be used to limitedly construe the technical scope of the present invention. This is because the present invention can be carried out in various modes without departing from the gist or main features of the present invention.

For example, the electrically powered suspension system 11 according to the embodiments of the present invention have been described using an example where the drive force determination part 55 performs the drive force determination on whether the actual drive force Fdr of the electromagnetic actuator 13 acquired by the information acquirer 43 falls within the predetermined force range FA. However, the present invention is not limited to this example.

The present invention may employ a configuration in which the drive force determination part 55 performs a drive force determination on whether the target drive force of the electromagnetic actuator 13 falls within the predetermined force range FA.

In addition, the electrically powered suspension systems 11 according to the embodiments of the present invention have been described using an example where if as a result of the drive force determination, the drive force determination part 55 determines that the actual drive force Fdr of the electromagnetic actuator 13 falls within the predetermined force range FA, the drive force determination part 55 sends the setting operation permission signal for permitting the setting operation based on the control mode setting information, to the damping force setter 51 and the telescopic force setter 53. However, the present invention is not limited to this example.

The present invention may employ a setting operation instruction signal for instructing the setting operation, instead of the setting operation permission signal for permitting the setting operation based on the control mode setting information.

Furthermore, the electrically powered suspension systems 11 according to the embodiments of the present invention have been described using an example where the multiple control modes of the electromagnetic actuator 13 are the comfort mode, the normal mode and the sport mode. However, the present invention is not limited to this example.

Any control modes may be employed as the control modes of the electromagnetic actuator 13 which are used in the present invention, as long as they have a function of controlling at least one of the damping force and the telescopic force of the electromagnetic actuator 13.

Moreover, the electrically powered suspension systems 11 according to the embodiments of the present invention have been described using an example where the four electromagnetic actuators 13 in total are arranged respectively in both the front wheels (the left front wheel and the right front wheel) and the rear wheels (the left rear wheel and the right rear wheel). However, the present invention is not limited to this example. The present invention may employ a configuration in which a total of two electromagnetic actuators 13 are arranged in either the front wheels or the rear wheels.

Finally, the electrically powered suspension systems 11 according to the embodiments of the present invention have been described referring to the drive controller 49 which controls the drives of the multiple electromagnetic actuators 13 independently of one another.

Specifically, the drive controller 49 may control the drives of the electromagnetic actuators 13 provided to the four wheels in a way that makes the controls in the respective wheels independent of one another.

Otherwise, the drive controller 49 may control the drives of the electromagnetic actuators 13 provided to the four wheels in a way that makes the controls in the front wheels and the controls in the rear wheels independent of each other, or in a way that makes the controls in the left wheels and the controls in the right wheels independent of each other.

What is claimed is:

1. An electrically powered suspension system comprising:
    electromagnetic actuators which are provided between a vehicle body and each of a plurality of wheels of a vehicle, and which generate a drive force for a damping operation, the drive force being within a first force range;
    an information acquirer which acquires information about the drive force of, and control mode selection information about, the electromagnetic actuators;
    a setter which sets a predetermined control mode based on the control mode selection information about the electromagnetic actuators acquired by the information acquirer, and sets a target damping force serving as a target value of the damping operation of the electromagnetic actuators based on setting information about the control mode; and
    a drive controller which controls drive of the electromagnetic actuators using a target drive force based on the target damping force set by the setter, wherein
    the setter sets the predetermined control mode for each of the plurality of wheels, independently, only when the drive force of a respective electromagnetic actuator, of the electromagnetic actuators, acquired by the information acquirer is within a predetermined force range, wherein
    the predetermined force range is narrower than and fully contained within the first force range.

2. An electrically powered suspension system comprising:
    electromagnetic actuators which are provided between a vehicle body and each of a plurality of wheels of a vehicle, and which generate drive forces for a damping operation and a telescopic operation, the drive forces being within a first force range;
    an information acquirer which acquires information about the drive forces of, and control mode selection information about, the electromagnetic actuators;
    a setter which sets a predetermined control mode based on the control mode selection information about the electromagnetic actuators acquired by the information acquirer, and sets a target damping force serving as a target value of the damping operation of the electromagnetic actuators and a target telescopic force serving as a target value of the telescopic operation of the electromagnetic actuators, based on setting information about the control mode; and
    a drive controller which controls drive of the electromagnetic actuators using a target drive force based on the target damping and telescopic forces set by the setter, wherein
    the setter performs an operation of switching a setting of the predetermined control mode from one to another for each of the plurality of wheels, independently, only when at least one of the target drive force, the target damping force, and the target telescopic force of a respective electromagnetic actuator, of the electromagnetic actuators, acquired by the information acquirer is within a predetermined force range, wherein
    the predetermined force range is narrower than and fully contained within the first force range.

3. The electrically powered suspension system according to claim 2, wherein
    the information acquirer acquires further information about a stroke velocity of the electromagnetic actuators, and information about a sprung velocity, and
    the setter
        sets the target damping force based on information about a damping force control mode and the information about the stroke velocity acquired by the information acquirer, and sets the target telescopic force based on information about a telescopic force control mode and the information about the sprung velocity acquired by the information acquirer, and performs an operation of switching a setting of the damping force control mode from one to another and an operation of switching a setting of the telescopic force control mode from one to another, independently, wherein the operation of switching the setting of the damping force control mode and the operation of switching the setting of the telescopic force control mode are allowed to be performed only when at least one of the target drive force, the target damping force, and the target telescopic force of the respective electromagnetic actuator, of the electromagnetic actuators, acquired by the information acquirer is within the predetermined force range.

4. The electrically powered suspension system according to claim 2, wherein the information acquirer acquires further information about a vehicle speed, and the setter controls a width of the predetermined force range based on the vehicle speed acquired by the information acquirer.

5. The electrically powered suspension system according to claim 2, wherein the information acquirer acquires further information about a condition of a drive force generator which generates a drive force of the vehicle, and the setter controls a width of the predetermined force range based on the condition of the drive force generator acquired by the information acquirer.

* * * * *